US012586064B2

(12) United States Patent (10) Patent No.: US 12,586,064 B2
Lee et al. (45) Date of Patent: Mar. 24, 2026

(54) BLOCKCHAIN PROVISION SYSTEM AND METHOD USING NON-COMPETITIVE CONSENSUS ALGORITHM AND MICRO-CHAIN ARCHITECTURE TO ENSURE TRANSACTION PROCESSING SPEED, SCALABILITY, AND SECURITY SUITABLE FOR COMMERCIAL SERVICES

(71) Applicants: EQBR Holdings CO., LTD, Seoul (KR); Jung Geun Lee, Seoul (KR); Hyun Ki Lee, Seoul (KR)

(72) Inventors: Jung Geun Lee, Seoul (KR); Hyun Ki Lee, Seoul (KR); Min Ki Lee, Seoul (KR); Jin Su Han, Seoul (KR); Young Hoon Jo, Seoul (KR); Beum Gyu Gwak, Seoul (KR)

(73) Assignees: EQBR HOLDINGS CO., LTD, Seoul (KR); Jung Geun Lee, Seoul (KR); Hyun Ki Lee, Seoul (KR)

( * ) Notice: Subject to any disclaimer, the term of this patent is extended or adjusted under 35 U.S.C. 154(b) by 75 days.

(21) Appl. No.: 18/343,729

(22) Filed: Jun. 28, 2023

(65) Prior Publication Data

US 2024/0211941 A1 Jun. 27, 2024

(30) Foreign Application Priority Data

Dec. 23, 2022 (KR) ........................ 10-2022-0182994

(51) Int. Cl.
*G06F 9/52* (2006.01)
*G06F 9/46* (2006.01)
(Continued)

(52) U.S. Cl.
CPC ......... *G06Q 20/3829* (2013.01); *G06F 9/466* (2013.01); *G06F 9/468* (2013.01);
(Continued)

(58) Field of Classification Search
CPC ............... G06Q 20/3829; G06Q 20/02; G06Q 20/3825; G06Q 20/065; G06F 9/466;
(Continued)

(56) References Cited

U.S. PATENT DOCUMENTS

2019/0182313 A1 6/2019 Yoo et al.
2019/0305958 A1 10/2019 Qiu
(Continued)

FOREIGN PATENT DOCUMENTS

JP 2021131870 A 9/2021
JP 2022527375 A 6/2022
(Continued)

OTHER PUBLICATIONS

Korean Office Action—Korean Application No. 10-2022-0182994 issued on Jan. 30, 2024, citing KR 10-2019-0067581, KR 10-2019-0083652, and KR 10-2057570.
(Continued)

*Primary Examiner* — Dong U Kim
(74) *Attorney, Agent, or Firm* — CANTOR COLBURN LLP

(57) ABSTRACT

Provided is a blockchain provision system using a non-competitive consensus algorithm and micro-chain architecture to ensure transaction processing speed, scalability, and security useful for commercial services. The system includes: a network providing the blockchain services. The network includes: mainnets communicating with other micro-chains according to an inter-chain communication protocol and issuing or burning a coin, and a micro-chain architecture connected to the mainnet and including a plurality of micro-chains in which a smart contract conclusion performed using the coin operates according to each area, and the micro-chains independently perform business logic without interfering with each other, and execute different
(Continued)

business logics to execute smart contracts corresponding to the micro-chains, respectively.

16 Claims, 11 Drawing Sheets

(51) Int. Cl.
*G06Q 20/02* (2012.01)
*G06Q 20/38* (2012.01)
(52) U.S. Cl.
CPC .............. *G06F 9/52* (2013.01); *G06Q 20/02* (2013.01); *G06Q 20/3825* (2013.01)
(58) Field of Classification Search
CPC ... H04L 9/50; H04L 9/3247; H04L 2209/463; H04L 2463/102
See application file for complete search history.

(56) References Cited

U.S. PATENT DOCUMENTS

| | | | |
|---|---|---|---|
| 2019/0334725 A1 | 10/2019 | Zhuang et al. | |
| 2020/0044827 A1* | 2/2020 | Snow ..................... | G06Q 20/12 |
| 2020/0302066 A1 | 9/2020 | Krishnaswamy et al. | |
| 2020/0322175 A1* | 10/2020 | Chen ..................... | H04L 9/3066 |
| 2021/0073212 A1* | 3/2021 | Conley ................. | H04L 9/3213 |
| 2021/0073913 A1 | 3/2021 | Ingargiola | |
| 2021/0081406 A1 | 3/2021 | Kwon et al. | |
| 2022/0284011 A1 | 9/2022 | Qian et al. | |
| 2023/0092484 A1* | 3/2023 | Liu ..................... | G06Q 20/3825 |
| | | | 705/75 |

FOREIGN PATENT DOCUMENTS

| | | | |
|---|---|---|---|
| JP | 2022544131 | A | 10/2022 |
| JP | 2022547130 | A | 11/2022 |
| KR | 101975822 | B1 | 5/2019 |
| KR | 101986081 | B1 | 6/2019 |
| KR | 20190067581 | A | 6/2019 |
| KR | 20190083652 | A | 7/2019 |
| KR | 102057570 | B1 | 1/2020 |
| KR | 20200056646 | A | 5/2020 |
| KR | 20210035480 | A | 4/2021 |
| KR | 20210066348 | A | 6/2021 |
| KR | 20220148396 | A | 11/2022 |

OTHER PUBLICATIONS

Korean Prior Art Search Report of Request for Accelerated Examination—Korean Application No. 10-2022-0182994 issued on Apr. 20, 2023, citing KR 10-1975822, KR 10-2021-0066348, KR 10-2057570, KR 10-1986081, KR. 10-2021-0035480, KR 10-2022-0148396, and KR 10-2020-0056646.
Japanese Office Action—Japanese Application No. 2023-112216 issued on Jun. 18, 2024, citing JP 2022-527375, JP 2022-547130, JP 2022-544131, and JP 2021-131870.
King et al., PPCoin: Peer-to peer crypto-currency with proof-of-stake, Aug. 19, 2012.
Nakamoto, Bitcoin: A peer-to-peer electronic cash system, 2008.
Popov, A probabilistic analysis of the nxt forging algorithm, Ledger, 2016, vol. 1, pp. 69-83.

* cited by examiner

| Transaction |
| --- |
| chainId |
| to |
| data |
| nonce |
| value |
| signature (V, R, S) |

MICRO-CHAIN (110)

⬡ : EQUALIZER NODE

◯ : NON-EQUALIZER NODE

BLOCKCHAIN PROVISION SYSTEM AND METHOD USING NON-COMPETITIVE CONSENSUS ALGORITHM AND MICRO-CHAIN ARCHITECTURE TO ENSURE TRANSACTION PROCESSING SPEED, SCALABILITY, AND SECURITY SUITABLE FOR COMMERCIAL SERVICES

BACKGROUND

1. Field

The present inventive concept relates to a blockchain provision system and method using a non-competitive consensus algorithm and micro-chain architecture to ensure transaction processing speed, scalability, and security useful for commercial services.

2. Description of Related Art

Blockchain is a distributed computing ledger management technology that may store small amounts of data in a chain-based distributed data storage environment connected by a peer-to-peer (P2P) hash that may safely perform Internet commerce electronic payments without verification by a third party, a financial institution. That is, the blockchain is a technology that achieves scalability, decentralization, and security by performing verification between terminals (nodes) of participants connected to a network without a central server.

A representative block chain document, Bitcoin [Nakamoto, Satoshi. "Bitcoin: A peer-to-peer electronic cash system." URL: https://bitcoin.org/bitcoin.pdf (2008)] was first published in 2008 by Satoshi Nakamoto who is an anonymous developer or group of developers. Bitcoin is the first successful cryptocurrency to solve the Byzantine generals problem and the double spending problem through a decentralized peer-to-peer network protocol that tracks and verifies transactions through a proof of work (PoW) consensus algorithm. In this proof-of-work consensus algorithm, a block containing cryptocurrency transactions is generated through a process called mining. During the mining process, all miners repeatedly search for a hash value smaller than a target value as a nonce according to the specified mining difficulty. First, a miner who searches for the nonce value that meets the above conditions has the right to generate a block and gets a certain amount of cryptocurrency as a reward in exchange for creating a block. Over time, the proof-of-work consensus method consumes enormous amounts of energy, generates huge mining pools due to a collusion of miners, and deviates from the initial goal of the blockchain to result in a network, generating another centralization problem. In addition, the proof-of-work consensus method of Bitcoin has the possibility of reconstructing blocks, so it takes up to an hour to reasonably confirm payment to prevent double spending, but Bitcoin has no efficient alternative to scale and improve the system, and also has limitations in the development of available practical services.

Meanwhile, in order to solve these problems, the upgraded version of Bitcoin, the Ethereum blockchain, was developed in 2013 by Vitalik Buterin. Focusing on the fact that not only currency transaction records but also additional information such as contracts may be recorded in the blockchain, which is a core technology used in a virtual currency, Bitcoin, Vitalik Buterin generated the Ethereum virtual machine (EVM) by utilizing computing resources possessed by numerous users around the world and used this platform to generate a system recording various types of information such as SNS, email, and electronic voting. In other words, Ethereum is essentially a breakthrough blockchain that may generate a smart contract and a decentralized application that may build an ultimate abstracted foundation layer, perform recording, consensus, and execution of code, and allow anyone to generate ownership, transaction formats, and arbitrary rules for ownership through the blockchain.

This Ethereum blockchain has some differences from the Bitcoin blockchain, but is similar in many aspects. Like Bitcoin, Ethereum has a flaw in that all transactions should be processed at all nodes in the network. In other words, Ethereum, which is an advanced proof-of-work method, is not easy to ensure decentralization with, because the existing proof-of-work method consumes enormous amounts of energy by using a competitive consensus algorithm and validators achieve another centralization, is considered difficult to apply to actual commercial services in terms of transaction processing speed (double spending prevention confirmation time: 6 to 10 minutes), is difficult to ensure scalability because the number of times of verifications increases greatly as the number of nodes increases, resulting in a slower consensus rate, and has a problem that gas generated to ensure integrity within the Ethereum is gradually increasing a transaction fee non-negligibly as a value of Ether, which is the internal currency of the Ethereum platform, increases.

Various attempts and studies are being conducted to improve the problems of these existing blockchains and prepare a better blockchain foundation.

First, to solve the problem of the proof-of-work consensus algorithm, proof of stake (PoS) consensus algorithm [King, Sunny, and Scott Nadal. "Ppcoin: Peer-to-peer cryptocurrency with proof-of-stake." URL: https://decred.org/research/king 2012.pdf (2012)] appeared. The proof of stake consensus algorithm is a term that refers to consensus algorithms in which validators have decision-making authority in proportion to their stake in cryptocurrency. Unlike the proof-of-work, the proof-of-stake method does not require computation (energy) intensive work, so the proof-of-stake method may solve the problem of enormous power consumption required in the proof-of-work and block attacks more effectively by 51% compared to the proof-of-work. However, the proof of stake still has problems such as transaction processing speed, decentralization, and security, and related research is continuously being conducted to solve these problems.

The peer coin [King, Sunny, and Scott Nadal. "Ppcoin: Peer-to-peer crypto-currency with proof-of-stake." URL: https://decred.org/research/king2012.pdf (2012)] is the first cryptocurrency that introduced the proof of stake consensus algorithm, and solves the problem of enormous energy consumption in pure proof-of-work by converging the proof-of-work and the proof of stake method that introduced coin age, but the decentralization of the peer coin is reduced because developers arbitrarily selects a checkpoint for preventing the problem of a long-distance attack that maliciously increases a coin holding period and makes a new chain a main chain.

Nxt [Popov, Serguei. "A probabilistic analysis of the nxt forging algorithm." Ledger 1 (2016): 69-83] is the first cryptocurrency purely implemented in the proof of stake method (using only the proof of stake consensus algorithm), and may generate a block by placing a stake while 1,440 blocks are generated in one account and searching for a hash value smaller than a basic target value for block generation in order to participate in the block creation process, but has a problem in that a monopoly occurs when a creator of a previous block intentionally inserts a value that is advantageous to him or her because the basic target value is generated based on the value of the previous block.

Ethereum announced Ethereum 2.0 (currently, collectively referred to as "upgrade") in September 2022, and announced beforehand the transition of the consensus algorithm from the proof-of-work to the proof of stake. Ethereum 2.0 is trying to solve the above problem by "a method to punish when voting on the wrong chain." Ethereum 2.0 is divided into Casper FFG (friendly finality gadget) led by Vitalik Buterin in the form of a mixture of proof-of-work and proof of stake and Casper correct by construction (CBC) led by Vlad Zamfir using pure proof of stake in the process of discussing a specific consensus algorithm. These Casper FFG and Casper CBC are to use the chain preferred by the most validators as the main chain based on the most recent message from the validators, and look similar to the method of using the longest chain as the main chain, but have an advantage in that when frequent divergence occurs, even if a small number of validators act maliciously, they may never defeat a number of validators.

Next, as a size of data is increasing, the capacity of the block needs to be too large in order to combine all the data with the blockchain, resulting in the disadvantage of greatly slowing down speeds and increasing fees. Various studies are being conducted to overcome the disadvantage.

Segregated Witness (SegWit) is Bitcoin-only and is a method for increasing scalability and transactions per second (TPS). By separating the transaction information and the signature among components of a Bitcoin transaction to eliminate a part occupied by the signature, which is an element required only when performing a validity check on a transaction, and filling with transaction information, it is possible to contain quite a bit of transaction information.

A method of extending a block size is literally a method of increasing the number of transactions included in one block by extending a block size. The method is the simplest and easiest method to implement, but has the disadvantage that it may be centralized by miners due to cost burden because it means that more transactions should be processed per unit time.

Sharding is an on-chain method that divides a network into shard units that horizontally divide transactions regardless of business domain, distributes and stores blockchain data, and divides data that needs to be verified by one node. The existing Ethereum verification method reduces the speed because all nodes have to store the entire block and process transactions, but when using the sharding method, reduces the amount of data that one node needs to verify because the blockchain data is divided into shard units to store and process transactions, to thereby improve the speed on the whole. However, when the number of shard units increases, transmission between multiple shards increases inter-shard transactions, which may rather degrade performance.

The Ethereum data is stored in the form of a Merkle Patricia Trie. The Ethereum data is a combination of A Merkle Tree and Patricia Trie, and has the characteristics of key-value mapping and each node holding a hash value. The Merkle Patricia Trie is composed of three types of nodes: extension node, branch node, and leaf node. The Merkle Patricia Trie is grafted with a B+tree to dualize the tree used according to the type or situation of stored data, to thereby increase spatial efficiency and data retrieval efficiency of branch nodes. When the amount of data coming from the Merkle Patricia Trie is small, it is possible to reduce an empty space in the branch node and efficiently execute from basic search to sequential search. When the amount of data is large, the existing Merkle Patricia Trie is used because a depth of the tree may increase when the above-described tree is used.

However, there may be a problem in that all of the conventional blockchain provision systems described above, which are currently being used by consumers or studied further, do not meet the transaction processing speed for commercial services, have limitations in scalability, or greatly slow down when extending.

SUMMARY

An aspect of the present disclosure may provide a blockchain provision system (blockchain provision system name: Equilibrium) and method using a non-competitive consensus algorithm and micro-chain architecture, which ensure a transaction processing speed, scalability, decentralization and, security useful for commercial services, by ensuring that the system operates normally without defects in the entire commercial blockchain network exceeding a predetermined ratio.

An aspect of the present disclosure may provide a blockchain solution for distributed commercial services by allowing the blockchain system of the present disclosure, the equilibrium to propose a new non-competitive consensus and micro-chain architecture for ensuring a transaction processing speed, scalability, decentralization, and security useful for commercial services, to thereby increase the transaction processing speed, achieve almost unlimited scalability, significantly lower transaction fees, and solve storage problems.

The present disclosure relates to a blockchain provision system and method using a non-competitive consensus algorithm and micro-chain architecture to ensure transaction processing speed, scalability, and security useful for commercial services.

First, according to an aspect of the present disclosure, a blockchain provision system using a non-competitive consensus algorithm achieves fast transaction processing speed. The blockchain provision system may include a non-equalizer node using a proof of stake consensus algorithm, and shares only a ledger without nodes according to an exemplary embodiment in the present disclosure participating in consensus; and an equalizer node connected to the non-equalizer node in the vicinity and other equalizer nodes in the vicinity, collects information of other nodes, participates in consensus, and performs verification of the smart contract.

A vote is performed on a block proposed by a block proposer among the equalizer nodes participating in the consensus, but the vote is agreed upon by the number of votes exceeding $2/3$ of the number of equalizer nodes having a stake for a specific proposal serving as a validator in a proof of stake consensus algorithm of various methods. When the number of equalizer nodes does not exceed $2/3$ in the vote stage, the vote continues in the next round until $2/3$ of the number of equalizer nodes is exceeded without stopping the vote.

Here, to create a node through an account and have the generated node become an equalizer, in an account balance of the node, more than the minimum staking amount of coins needs to be staked. Nodes with no stake serve as the non-equalizer.

In addition, according to an aspect of the present disclosure, newly generated transactions are allocated to each equalizer node and the blockchain provision system may include a mempool, a temporary transaction storage storing a transaction including a key value obtained by converting a hash of a non-consensus transaction of the equalizer node and a signature of a private key. When there is no transaction in the mempool to generate a new block, the transaction is added and propagated to other equalizer nodes, and when the transaction exists, no action is taken. The transaction in the mempool may not be counterfeited because the transaction contains a signature of a private key that causes the transaction, and the equalizer node that receives the transaction and stores the transaction in the mempool propagates the transaction stored in the mempool to other equalizer nodes, and thus, may not arbitrarily delete the stored transaction. Even if a node is powered off and the memory is initialized, no specific transaction is omitted because all transactions are propagated to other equalizer nodes.

In this case, according to an exemplary embodiment in the present disclosure, the equalizer node may receive the transaction through a transaction request regardless of a consensus process, perform a validity check on the received transaction, and then store the transaction in the mempool.

Next, according to an exemplary embodiment in the present disclosure, a blockchain provision system using the micro-chain architecture applies a concept based on micro-service architecture of the conventional computer network to the blockchain to minimize interference by storing and processing transactions for each business domain, that is, prevents transaction processing speed from being reduced because micro-chains may operate in a state of fault isolation and minimal interference while increasing business scalability in commercial services without limit. The blockchain provision system includes a network providing the blockchain services, in which the network may include mainnets communicating with other micro-chains according to an inter-chain communication protocol and issuing or burning a coin, and a micro-chain architecture including a plurality of micro-chains in which a smart contract conclusion performed using the coin on each of the mainnets operates according to each transaction area. The micro-chain architecture needs to go through the mainnet to connect each micro-chain. In this case, the transferred information deals only with information limited to tokens or coins.

Meanwhile, according to an aspect of the present disclosure, a blockchain provision method using a non-competitive consensus algorithm and micro-chain includes: in the above-described blockchain provision system, a propose stage of generating, by an equalizer node selected as a block proposer, a block including a transaction for consensus and propagating the generated block to other equalizer nodes; a prevote stage of verifying, by other equalizer nodes receiving the block (transaction), validity of the received block (transaction) and propagating a prevote to other equalizer nodes when verification is completed; a vote stage of performing a vote on a propose of the equalizer node to bring the block (transaction) into a consensus and propagating votes signed with a private key to other equalizer nodes, when an equalizer node exceeding a predetermined ratio propagates the prevote; and a commit stage of executing, by each equalizer node, a transaction in the proposed block, confirming the propose, and putting the propose into a database when votes of the equalizer nodes exceeding the predetermined ratio are collected and the block (transaction) is confirmed. In the vote stage, the proposed block is verified without stacking other blocks, and after the vote is performed on the proposed block and complete consensus is achieved by receiving votes exceeding the quorum, a new block is generated by stacking a block on the proposed block.

The blockchain provision method may further include: receiving a transaction when there is a transaction request regardless of the progress of the consensus stage, and storing the transaction in a mempool of the requested equalizer node when a validity check for the transaction is completed; and transferring the transaction stored in the mempool to other equalizer nodes.

According to an aspect of the present disclosure, the blockchain provision method may include, prior to the propose stage according to an exemplary embodiment in the present disclosure, acquiring, by each equalizer node, a priority through a round robin method and selecting an equalizer node having a highest assigned priority as a block proposer.

According to an exemplary embodiment in the present disclosure, the blockchain provision method may include: for the propose stage to generate a transaction for consensus, generating a transaction list by integrating only transactions having a nonce of an account that sequentially increases from a nonce of a current account among transactions stored in the mempools of each equalizer node; and hashing a proposal including a height, a round, and a block for the transaction list and signing the proposal with a private key.

The vote according to an exemplary embodiment in the present disclosure is agreed upon by the number of votes exceeding ⅔ of the number of equalizer nodes having a stake in a specific proposal that serves as a validator in a proof of stake consensus algorithm of various methods. Accordingly, since the present disclosure enables a simple consensus procedure and rapid processing, nodes with low-end computers may also participate in the consensus procedure of the present disclosure.

In the commit stage according to an exemplary embodiment in the present disclosure, when the votes of the equalizer nodes exceeding the predetermined ratio are collected and the transaction is confirmed, transactions within blocks proposed by each equalizer node are executed and the confirmed propose is inserted into the database. When the votes of the equalizer nodes exceeding the predetermined ratio are not collected or the valid propose is not received within a predetermined time, the equalizer node may increase the round by one stage and re-perform from the propose stage.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figures 1, 2:
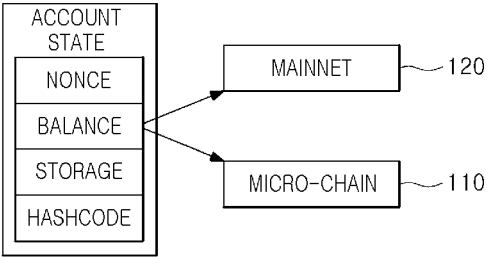
FIG. 1 is a diagram illustrating an account state structure for ensuring a transaction processing speed and scalability useful for commercial services according to an exemplary embodiment in the present disclosure.
FIG. 2 is a diagram illustrating a transaction structure for ensuring a transaction processing speed and scalability useful for commercial services according to an exemplary embodiment in the present disclosure.

The foregoing and additional aspects are embodied through exemplary embodiments described with reference to the accompanying drawings.

Exemplary embodiments in the present disclosure are illustrated for the purpose of describing the technical concept and business method of the present disclosure. The scope of rights according to the present disclosure is not limited to the exemplary embodiments presented below or specific descriptions of these exemplary embodiments.

All technical terms and scientific terms used in the present disclosure have meanings commonly understood by those of ordinary skill in the art to which the present disclosure belongs, unless otherwise defined. This may vary according to the intention of a technician working in the field, a precedent, the emergence of a new technology, etc. Therefore, the terms used in exemplary embodiments in the present disclosure should be defined on the basis of the meaning of the terms and the contents throughout the present disclosure rather than simple names of the terms. All terms used in the present disclosure are selected for the purpose of more clearly describing the present disclosure and are not selected to limit the scope of rights according to the present disclosure.

Expressions such as "including," "comprising," "having," etc., used in the present disclosure should be understood in open-ended terms, encompassing the possibility of including other exemplary embodiments unless specifically stated otherwise in the phrase or sentence in which the expression is included.

Singular expressions described in the present disclosure may include plural meanings unless otherwise stated, which applies to singular expressions described in the claims as well.

Each block in the drawing may represent physical parts in some cases, but in another case, may be a logical representation of a function of a part of a function of one physical part or a function spanning a plurality of physical parts. Sometimes, the substance of a block or part thereof may be a set of program instructions. All or part of these blocks may be implemented by hardware, software, or a combination thereof.

It is understood that components of each exemplary embodiment are possible in various combinations within an exemplary embodiment unless otherwise stated or contradictory to each other.

Hereinafter, exemplary embodiments of the disclosure will be described in detail with reference to the accompanying drawings so that those skilled in the art to which the present disclosure pertains may easily practice the present disclosure. However, the present disclosure may be implemented in various different forms, and is not limited to exemplary embodiments described herein.

Figure 3:
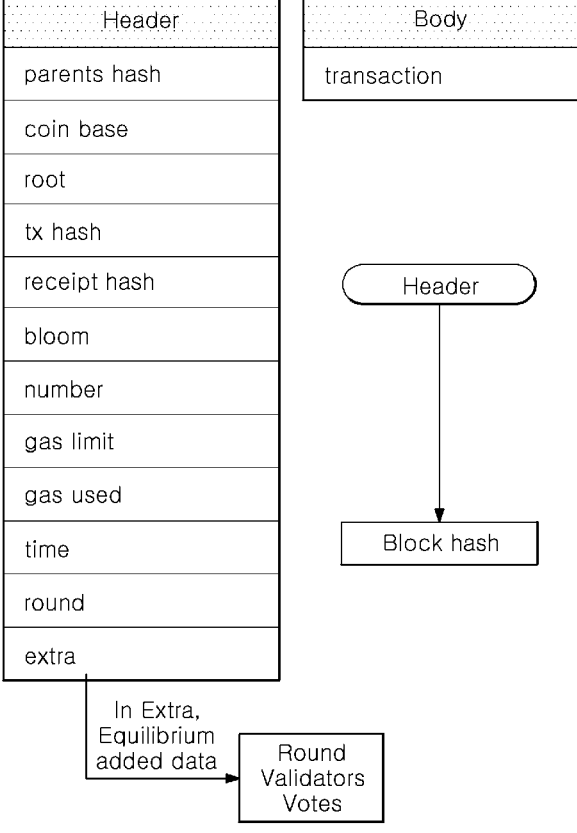
FIG. 3 is a diagram illustrating a block structure for ensuring a transaction processing speed and scalability useful for commercial services according to an exemplary embodiment in the present disclosure.

FIGS. 1 to 3 each illustrate an "account state structure," "transaction structure," and "block structure" of a blockchain provision system using a non-competitive consensus algorithm to ensure transaction processing speed, scalability, decentralization, and security useful for commercial services according to an exemplary embodiment in the present disclosure.

As illustrated in FIG. 1, as an exemplary embodiment, the "state" in this blockchain network is composed of an object called "account," and the account of each node is represented by a 20-byte address starting with "0x" and controlled by a private key. The account may include fields such as nonce, balance, code, and storage.

The "nonce" indicates the number of consensus transactions among transactions generated in the account up to now, and may prevent duplication or omission of transactions generated in a specific account through a nonce. This prevents replay attacks in which other participants in the network duplicate transactions of a specific account, and prevents omissions, so transactions of a specific account are processed sequentially.

The "balance" is a balance of coins used as currency in the network, and when coins are staked in the account of each node, the node may become an equalizer node. Unlike the Ethereum blockchain account, the balance is divided into a mainnet 120 balance and a micro-chain balance that do not interfere with each other.

The "hashcode (CodeHash)" may represent an account code of a smart contract, and may call the code of the smart contract whenever a transaction is executed.

The "storage" refers to a storage that represents the account state.

As an exemplary embodiment, to transit the "account state," a new transaction needs to be generated and the transaction needs to be signed with a private key. When a new transaction is sent to the blockchain provision system, the system checks the account state to apply the transaction, and when the conditions are correct, the system executes the transaction to transit the state.

In addition, as illustrated in FIG. 2, the transaction according to an exemplary embodiment in the present disclosure represents a signed data package for an account to request a state transition within the network, and each transaction may include chainID, from, to, data, nonce, value, and signature fields.

The "chainID" field indicates a target chain ID, and may prevent transaction replay attacks on other chains. In addition, the "from" is an account that generates a transaction, and the "to" field is an account of a transaction target to which the transaction is transferred.

The above "data" is a field for executing an account code that transits the account state when the account is a contract account (CA) among two types of accounts: external owned account (EOA) and contract account (CA). Here, the difference between the EOA and the CA is in the "hashcode" field and the "storage" field. The EOA simply stores the balance of the account, so the hashcode and storage fields are empty, while the CA may store the contract code and contract state in the hashcode and storage fields, respectively.

The "value" field means the amount of coins to be transferred to the target account, and the "signature" (V, R, S) is a common standard for coins and may play a role in confirming the source of the transaction.

In addition, as illustrated in FIG. 3, as a field included in the block structure, which is a data unit for storing results of consensus and verified transactions according to an exemplary embodiment in the present disclosure, "parent hash" is the most recent (highest height in the blockchain network at this point) block hash, and "parent hash", "time", and "bloom" mean values used as standard in blockchain technology. "coinbase" is an account address of a node generating a proposal containing the transaction for consensus, "root" is a Merkle hash of the state, and "Tx hash" is the hash of the transaction included in the block.

When the transaction in the block are processed, a receipt is generated for each transaction. The receipt contains execution results and events during the processing of the transaction. "receipt hash" refers to the SHA-256 hash of a receipt for a transaction in a particular block, "number" refers to an index of the corresponding block, "gas limit" refers to a value that defines a maximum gas limit that all transactions in a block may use, and "gas used" refers to the total gas used by transactions in the block For the Equilibrium network consensus of the present disclosure, the block hash value may be calculated using a hash of a block header. "round", "Validator", and "Votes" items have been added to "extraDATA", and the "round" is a natural number value indicating the time when the corresponding block is agreed upon and generated, and when results greater than or equal to the quorum are not obtained in the vote stage for verifying the proposed block, the vote may be performed again so that the liveness of the proposed block (transaction) may be performed within a short period of time.

There are two types of nodes according to an exemplary embodiment in the present disclosure: an equalizer node 220 and a non-equalizer node 210. The node may be the equalizer node 220 or the non-equalizer node 210 according to a "staking policy" of the network.

To create a node through an account and have the generated node become the equalizer node 220, you should have a stake by staking more than the minimum staking amount of coins from the account balance of the node. All equalizer nodes 220 that have at least staked coins greater than or equal to the minimum staking amount have the same voting power despite the difference in staking amount, and as a result, the present disclosure may quickly and easily determine a block proposer 221. In addition, since all nodes do not participate in consensus and only equalizer nodes 220 that stake coins greater than or equal to the minimum staking amount participate in consensus, a vote time may also be shortened. The equalizer node 220 serving as the validator participates in consensus with other equalizer nodes 220 in the network and has the right to read and write a ledger.

The equalizer node 220 according to an exemplary embodiment in the present disclosure processes a request received in a state where there is no mutual agreement and then does not notify the result, but responds with data related to the request processed in the consensus process to perform the synchronization between the equalizer nodes 220.

Meanwhile, a node with no stake serves as a basic non-equalizer. The non-equalizer node 210 is a node that shares only the ledger in real time without participating in consensus, and is a node used by secondary operators who want to use data in the network and provide additional services.

The equalizer node 220 is a node connected to the non-equalizer nodes 210 and other equalizer nodes 220 in the vicinity, collects information of other nodes, participates in consensus, and performs verification.

The equalizer node 220 serving as the validator directly participates in consensus with other equalizer nodes 220 in the network and has the right to read and write a ledger, to thereby generate the block and maintain the network. Since the non-equalizer node 210 does not participate in consensus and only shares the ledger in real time, the process of networking and receiving and checking data may be lightened. That is, the transaction processing speed may increase.

The equalizer node 220 according to an exemplary embodiment in the present disclosure processes a request received in a state where there is no mutual agreement and then does not notify the result, but responds with data related to the request processed in the consensus process to perform the synchronization between the equalizer nodes 220.

In addition, according to an exemplary embodiment in the present disclosure, newly generated transactions are allocated to each equalizer node 220 and the blockchain provision system may include a mempool, a temporary transaction storage storing a transaction including a key value obtained by converting a hash of a non-consensus transaction of the equalizer node 220 and a signature of a private key. When there is no transaction in a new block in the mempool, the transaction is added and propagated to other equalizers, and when the transaction exists, no action is taken. The transaction in the mempool may not be counterfeited because the transaction contains a signature of a private key that causes the transaction, and the equalizer node 220 that receives the transaction and stores the transaction in the mempool propagates the transaction 220 stored in the mempool to other equalizer nodes 220, and thus, may not arbitrarily delete the stored transaction. Even if a node is powered off and the memory is initialized, no specific transaction is omitted because all transactions are propagated to other equalizer nodes 220.

In this case, according to an exemplary embodiment in the present disclosure, the equalizer node 220 may receive the transaction through a transaction request regardless of a consensus process, perform a validity check on the received transaction, and then store the transaction in the mempool.

A blockchain provision system using a non-competitive consensus algorithm and a micro-chain 110 to ensure transaction processing speed, scalability, decentralization, and security useful for commercial services according to an exemplary embodiment in the present disclosure includes a network providing blockchain services, in which the network includes a plurality of mainnets 120 that issue and burn coins to maintain the entire network, and a plurality of micro-chains 110 that are generated according to various business areas on the mainnet 120. The mainnet 120 may be composed of micro-chain architecture that communicates with all the micro-chains 110 through an inter-chain communication protocol called a linking solution.

In the conventional blockchain, all business smart contracts operate on one chain, and all nodes simultaneously execute the same business logic of the smart contract, resulting in interference of smart contracts having different processing speeds, but the Equilibrium networks of the present disclosure do not interfere with each other in any way except the case where different business domains need to interact with each other. That is, the micro-chains 110 according to an exemplary embodiment in the present disclosure independently perform business logics without interfering with each other, and different business logics to execute the smart contract corresponding to the micro-chain 110 may each be executed independently of each other. Due to this, the Equilibrium network of the present disclosure can implement almost unlimited horizontal expansion (scale-out) without reducing the transaction processing speed.

Figure 4:
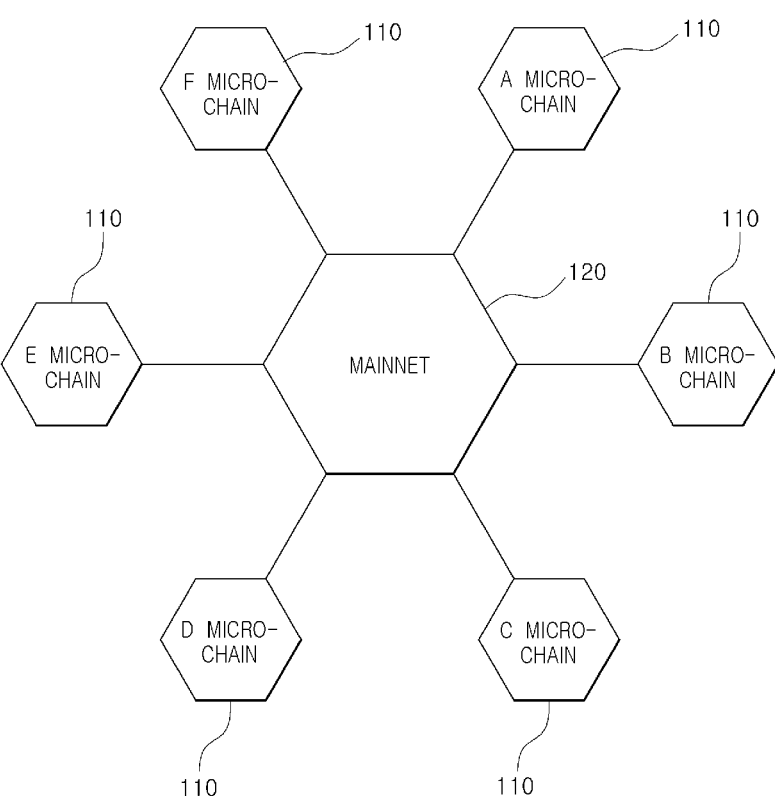
FIG. 4 is a diagram illustrating micro-chain architecture of a blockchain provision system using a micro-chain to ensure transaction processing speed and scalability useful for commercial services according to an exemplary embodiment in the present disclosure.

FIG. 4 illustrates the micro-chain architecture of the blockchain provision system to ensure transaction processing speed, scalability, decentralization, and security useful for commercial services according to an exemplary embodiment in the present disclosure, and an exemplary embodiment in the present disclosure will be described with reference to FIGS. 5 to 11.

As illustrated in FIG. 4, the network according to an exemplary embodiment in the present disclosure may be composed of several micro-chains 110, and the mainnet 120 is connected to A to F micro-chains 110, and each A to F micro-chain 110 may be separated and executed independently of each other.

Each A to F micro-chain 110 provides a separate block-chain service, and each may build different business domains. In this way, it is possible to execute smart contracts having different processing speeds for each blockchain service independently without causing interference between the smart contracts, and even if the micro-chain 110 is added, since there is no effect on the transaction processing speed, the micro-chains are continuously added as needed, so the network according to an exemplary embodiment in the present disclosure may horizontally continue to expand unlimitedly.

In the conventional Ethereum technology, layer 1 and layer 2 are subordinated in a vertical relationship, and layer 2 may perform logic by securing the trust of layer 1, so layer 2 may not be scaled without securing the consent of layer 1. However, according to an exemplary embodiment in the present disclosure, the mainnet 120 for issuing or burning coins communicates with each micro-chain 110 according to the issued coin, and each A to F micro-chain 110 may form and scale additional micro-chains without the consent of the mainnet 120 since each A to F micro-chain secures its trust. In other words, the mainnet 120 and the micro-chain 110 are loosely connected in an equal relationship, and each micro-chain 110 may independently perform its own business logic, so the scalability may be secured by connecting additional micro-chains. Referring to FIG. 4 as an example, the F micro-chain is not directly connected to the mainnet 120 but indirectly connected, and may be scaled by connecting a separate micro-chain directly connected to itself.

Meanwhile, since each A to F micro-chain 110 according to an exemplary embodiment in the present disclosure secures its own trust, even if some business domains are attacked or fault occurs due to an overload of the network, the fault of the remaining micro-chains 110 except for the corresponding business domain may be isolated. For example, even if the fault occurs in the A micro-chain 110, each B to F micro-chain 110 may perform independent business logic without interference.

Therefore, according to an exemplary embodiment in the present disclosure, since the plurality of micro-chains 110 are loosely connected in an equal relationship by mutually securing the trust with the mainnet 120, and the mainnet 120 does not endure all of the trust, it is possible to easily secure scalability, and each micro-chain 110 only needs to endure its own business logic that is performed independently. Due to this, it is possible to operate only with a low-end computer enough to endure the business logic of each micro-chain 110.

In addition, according to an exemplary embodiment, it is scalable from at least one micro-chain 110 to a new micro-chain that is not directly connected to the mainnet 120.

At this time, the mainnet 120 may communicate with the micro-chain 110 through the linking solution such as an inter-chain communication protocol.

According to an exemplary embodiment in the present disclosure, since the micro-chains 110 are formed to operate according to each area, the micro-chains 110 independently perform the business logic without interfering with each other, except the case where the micro-chains have to interact with each other, and different business logics to perform the smart contract corresponding to the micro-chain 110 may be executed respectively.

The micro-chain 110 divides transactions based on the business domain so the transactions generated within the micro-chain 110 do not affect other micro-chains 110 and are used only to generate blocks inside.

Sharding, which may be compared to the micro-chain 110, is a method of horizontally dividing transactions regardless of a business domain. When performing the same transaction, the transmission is required between several shards. In this case, there is a difference from the micro-chain architecture of the present disclosure in that the inter-shard transaction may increase, and thus, performance may deteriorate.

As an example, the micro-chain 110 performs an inter-ledger communication to enable inter-chain asset movement.

Figure 5:
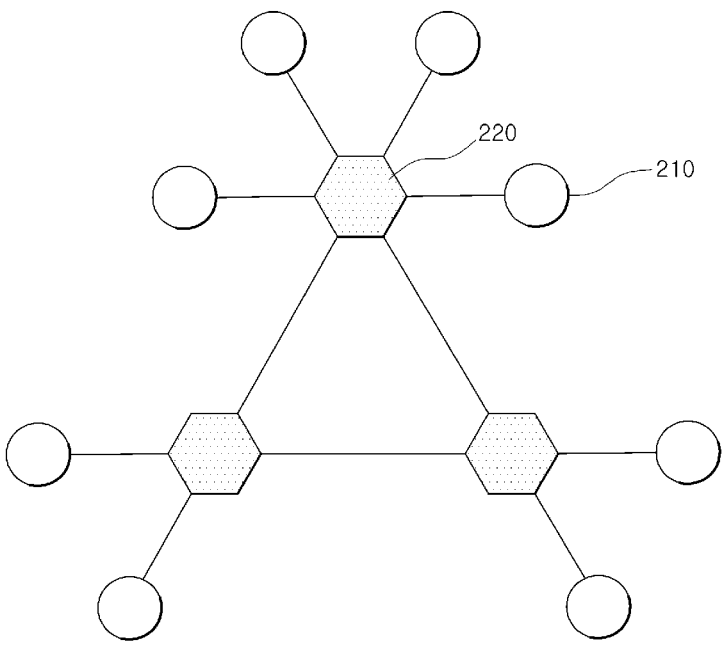
FIG. 5 is a diagram illustrating a micro-chain structure composed of a non-equalizer node and an equalizer node of the blockchain provision system using a non-competitive consensus algorithm and a micro-chain to ensure transaction processing speed and scalability useful for commercial services according to an exemplary embodiment in the present disclosure.

In addition, as illustrated in FIG. 5, the micro-chain architecture according to an exemplary embodiment in the present disclosure may include the non-equalizer node 210 that shares only the ledger without participating in consensus and the equalizer node 220 connected to the non-equalizer node 210 and other equalizer nodes 220 in the vicinity, collects information of other nodes, and participates in consensus to perform verification.

The equalizer node 220 and the non-equalizer node 210 may separate a node that provides a service for maintaining the network and a node that participates in the network according to their respective roles, to thereby lighten the process of networking, and receiving and verifying data. That is, the transaction processing speed may increase.

In this case, the connection of other equalizer nodes 220 of the equalizer node 220 with the non-equalizer node 210 may be composed of a request and a response.

In the state in which the connection is established with the request and response, the equalizer node 220 may process the request received in a state where there is no mutual agreement, and then respond with data related to the request processed in the consensus process to perform the synchronization between the equalizer nodes 220. In this case, it may be processed synchronously, including partial synchronization.

In addition, according to an exemplary embodiment in the present disclosure, the blockchain provision system may include a mempool that is allocated to each equalizer node 220 and stores a transaction including a key value obtained by converting a hash of a non-consensus transaction of the equalizer node 220 and a signature of a private key.

As an exemplary embodiment, the mempool may be a memory, and the temporary transaction storage may be allocated by assigning the memory to the equalizer node 220 participating in the network. Since the mempool contains the signature of the private key, forgery may be prevented, and the temporary transaction stored in the mempool may be propagated to other equalizer nodes 220, so the transaction cannot be deleted arbitrarily, and even if the node is powered off and the memory is initialized, the omission of a specific transaction may be prevented by using the mempool of another equalizer node 220.

In this case, the equalizer node 220 may receive the transaction through the transaction request regardless of the consensus process, and go through a transaction validity check including whether the received transaction has a valid size, whether the data structure is valid, whether it is greater than or equal to a current nonce value of a sender, whether a sender's address is valid, whether a sender's signature is valid, whether there is a smart contract to invoke, what functions are included in the smart contract, whether the element of the smart contract to be invoked is valid, or the like. When all the transaction validity checks pass, the transaction may be stored in the mempool of the requested node.

The equalizer nodes 220 may perform the consensus using the configurations of the above-described network.

Figure 6:
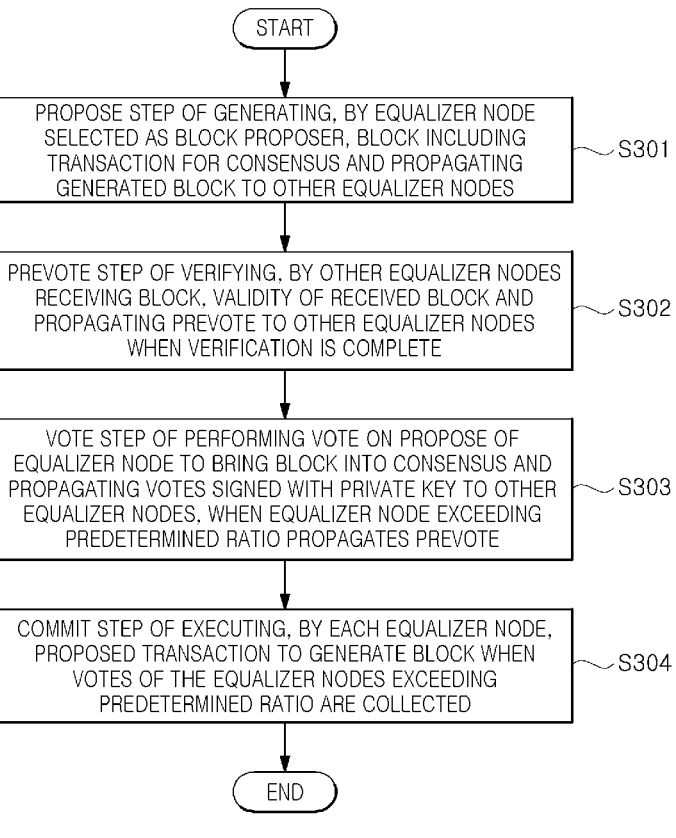
FIG. 6 is a diagram illustrating a flowchart of a blockchain provision method using a non-competitive consensus algorithm and a micro-chain to ensure transaction processing speed and scalability useful for commercial services according to an exemplary embodiment in the present disclosure.

As illustrated in FIG. 6, a blockchain provision method using a non-competitive consensus algorithm to ensure transaction processing speed, scalability, decentralization, and security useful for commercial services according to an exemplary embodiment in the present disclosure may largely include four stages: propose, prevote, vote, and commit.

The equalizer, which adjusts a disorder of a ledger in the above-described blockchain provision system, selects the equalizer node 220, which is the block proposer 221, and may include a propose stage of generating, by the equalizer node 220 selected as the block proposer 221, a block including a transaction for consensus and propagating the generated block to other equalizer nodes 220 (S301), a prevote stage of verifying, by other equalizer nodes 220 receiving the block, validity of the received block (transaction) and propagating a prevote to other equalizer nodes 220 when verification is completed (S302), a vote stage of performing a vote on a propose of the equalizer node 220 to bring the block (transaction) into a consensus and propagating votes signed with a private key to other equalizer nodes 220, when an equalizer node 220 exceeding a predetermined ratio propagates the prevote (S303), and a commit stage of executing, by each equalizer node 220, a proposed transaction to generate a block when votes of the equalizer nodes 220 exceeding a predetermined ratio are collected and the block is confirmed (S304).

The prevote stage performs a vote on the validity of the proposal in a true or false method which is a non-arithmetic logical operation.

In the vote stage, the proposed block is verified without stacking other blocks, and after the vote is performed on the proposed block and complete consensus is achieved by receiving votes exceeding the quorum, a new block is generated and linked to the existing blockchain.

In this case, the block generated in the vote stage is configured to be generated separately according to the prevote and the vote for the propose, without being stacked by being added to the previously generated block.

To explain this more specifically, since all equalizer nodes 220 have the same voting power without communication with other nodes, it is possible to more quickly determine who is a block generator in the stage before the propose stage. In addition, in the PoW model, when a block generator creates a block including a transaction, since other validators verify the entire block in a way to stack the next transaction or another block, so Bitcoin has 6 block lengths and Ethereum has 12 to 20 block lengths. However, in the present disclosure, since one block determined by checking, by the block proposer 221, whether the block is a block in which a legitimately verified transaction is written, without separately stacking the block, is created through a quorum of more than ⅔ through a vote, and the created block is immediately determined as a legitimate block, the next block does not affect the legitimate block confirmation, so the block decision time may be greatly reduced.

In other words, the present disclosure propagates the proposed block to the network immediately upon verification in the vote stage, without stacking other blocks on the proposed block. Thereafter, after receiving the vote for the proposed block, receiving the vote exceeding the quorum, and completely reaching consensus, a new block is generated by stacking other blocks on the proposed block. Meanwhile, in the POW methods such as Bitcoin and Ethereum, a new block is stacked on the proposed block immediately upon verification, a longer stacked blockchain is selected, and the block is confirmed, and there are many differences in traffic within the network from the present disclosure.

In addition, in the present disclosure, the decentralization is strengthened because all nodes have the same voting power when the minimum staking amount is satisfied, and in order for an external network attacker to control the network, the difficulty of attacking more nodes at the same time increases, so security may be greatly strengthened. On the other hand, the conventional staking-based pBFT algorithm has a relatively faster processing speed than the previous consensus algorithm, but due to the structure in which the greater the staking amount, the greater the reward, the rich get richer and the poor get poorer phenomenon may occur, which may hinder the decentralization of the network. In addition, the conventional pBFT consensus algorithm (PoS), which may exercise voting power having a large staking amount, allows external attackers to easily identify attack points, but is relatively weak in security because the network may be more effectively controlled due to attacks on nodes having a large staking amount. For example, the reason is that an external network attacker may attack at any time by specifying 21 nodes having a high staking amount against the conventional staking-based pBFT algorithm.

In addition, according to an exemplary embodiment in the present disclosure, the equalizer node 220 that has staked coins greater than or equal to the minimum staking amount is randomly determined from among the equalizer nodes 220 having the same voting power according to the minimum number of nodes calculated to endure Byzantine fault, and the determined equalizer nodes 220 greater than or equal to the minimum number of nodes may participate in consensus and perform the verification of the smart contract.

In order to prevent malicious nodes from incapacitating the network, the minimum number of nodes to participate in a vote is set, and is randomly determined as many as the set number of nodes. A method of randomly determining a node may be determined using various well-known methods and is not limited thereto.

In addition, the reason why the present disclosure uses two rounds of voting, such as the prevote stage and the vote stage, is to double strengthen against malicious nodes incapacitating the network.

According to an exemplary embodiment in the present disclosure, the blockchain provision method may further include: receiving a transaction when there is a transaction request regardless of the progress of the consensus stage, and storing the transaction in a mempool of the requested equalizer node 220 when a validity check for the transaction is completed; and transferring the transaction stored in the mempool to other equalizer nodes 220.

In addition, the conventional proof-of-work consensus algorithm required a high-end computer for mining to generate a new block, but the present disclosure has an effect that even nodes having low-end computers may participate in the consensus procedure due to a simple consensus procedure and rapid processing. That is, nodes having a low-end computer may easily participate in the consensus procedure by easily participating in the blockchain provision system of the present disclosure.

Figure 7:
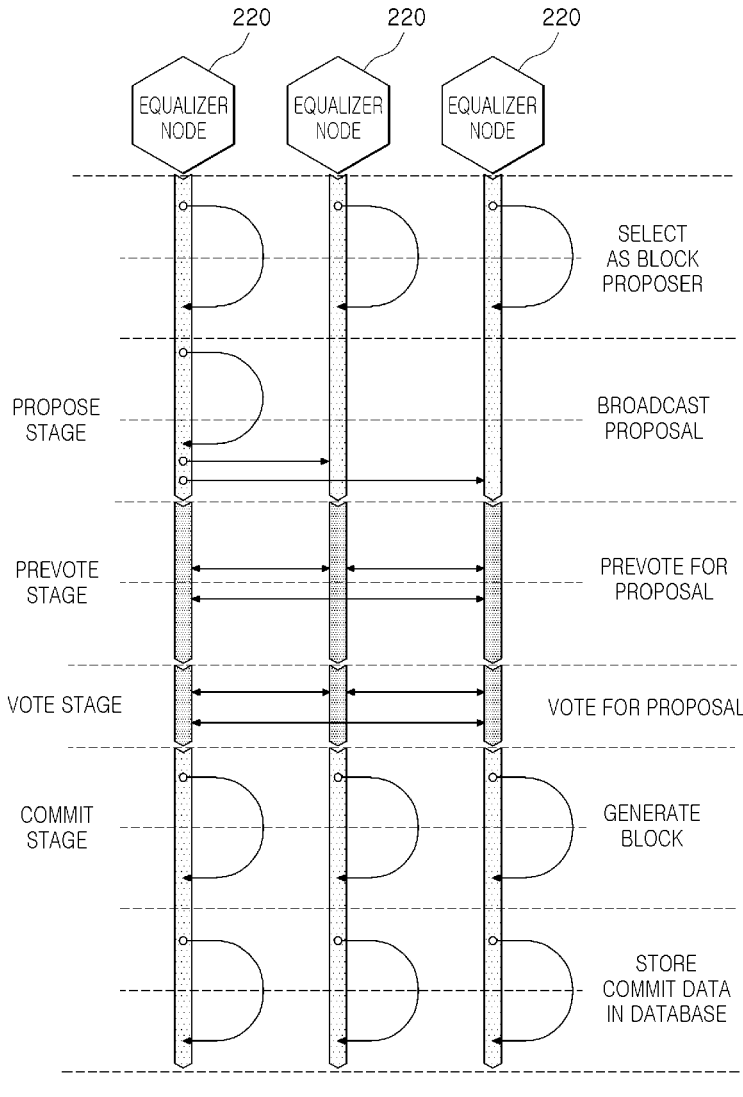
FIG. 7 is a diagram illustrating a consensus process of the blockchain provision method using a non-competitive consensus algorithm and a micro-chain to ensure transaction processing speed and scalability useful for commercial services according to an exemplary embodiment in the present disclosure.

As illustrated in FIG. 7, prior to the propose stage (S301) according to an exemplary embodiment in the present disclosure, the blockchain provision method may include a stage (proposer election) of acquiring, by each equalizer node 220, a priority through a round-robin method, and selecting the equalizer node 220 having the allocated highest priority as the block proposer 221.

A block proposer 221 of a specific round may be randomly selected from among a certain number of equalizer nodes 220 randomly selected from among all equalizer nodes 220.

When nodes maintain the same ledger, proposers selected by the equalizer node 220 in a particular round are all the same. The proposer node generates a proposal, and other nodes should wait for the proposal of the proposer node.

As an exemplary embodiment, the "propose stage (S301)" may include generating a transaction list by integrating only transactions having a nonce of an account that sequentially increases from the nonce of the current account among the transactions stored in the mempools of each equalizer node 220 in order to generate a transaction for consensus.

For example, when the current nonce of account A is 20, the transaction list may be generated with transactions in which the transaction nonce whose source address is address A is 20, 21, and 22.

Figure 8:
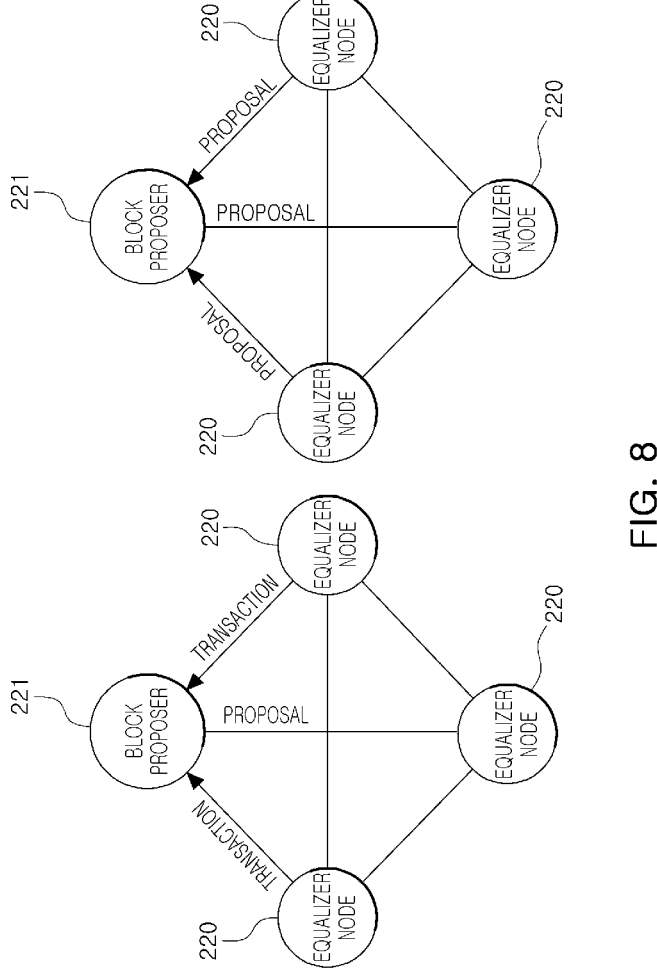
FIG. 8 is a diagram illustrating a propose stage of the blockchain provision method using a non-competitive consensus algorithm and a micro-chain to ensure transaction processing speed and scalability useful for commercial services according to an exemplary embodiment in the present disclosure.

In this case, as illustrated in FIG. 8, the transactions stored in the mempool allocated to each equalizer node 220 may be transferred to the equalizer node 220 which is the proposer, and the proposer may check the nonce value of the account to generate the transaction list.

According to an exemplary embodiment in the present disclosure, the blockchain provision method may further include: receiving a transaction when there is a transaction request regardless of the progress of the consensus stage, and storing the transaction in a mempool of the requested equalizer node 220 when a validity check for the transaction is completed; and transferring the transaction stored in the mempool to other equalizer nodes 220.

In other words, the equalizer node 220 may transfer the transaction to the equalizer node 220, which is the proposer, to perform the consensus stage, and as another exemplary embodiment, regardless of the consensus stage, the transaction for which the validity check is completed as described above is stored in the mempool, and the stored transaction may be transferred to other equalizer nodes 220.

In addition, as an exemplary embodiment, the blockchain provision method may include hashing a proposal including a height, a round, and a block for the transaction list and signing the proposal with a private key.

The proposal includes the height, round, block, and signature fields for the transactions included in the transaction list, and after signing the signature with a private key, may be propagated to other equalizer nodes 220.

According to an exemplary embodiment, the equalizer node 220 selected as a proposer may broadcast a proposal, which is a transaction for consensus, and propagate the proposal to other equalizer nodes 220.

Meanwhile, the "prevote stage (S302)" is a stage of determining which proposal to vote for, and the equalizer node 220 receiving the proposal from the proposer may verify the validity of the proposal.

For example, it is possible to verify whether the propose of the proposal is received from a valid proposer, whether the valid block is included in the proposal, and whether the signature of the proposal is valid.

In the prevote stage, the vote on the validity of proposals is performed in the true or false method which is the non-arithmetic logic operation method.

According to an exemplary embodiment, as illustrated in FIG. 8, when the propose is considered valid, the equalizer node 220 may propagate a prevote to other equalizer nodes 220, and when there is a prevote that exceeds ⅔ of the total number of equalizer nodes 220 for a specific propose, may consider that the propose is valid and proceed to the vote stage (S303). That is, the predetermined ratio may mean ⅔ of the total number of equalizer nodes 220 or the randomly selected number of equalizer nodes 220 from among the predetermined number of randomly selected equalizer nodes 220.

Figure 9:
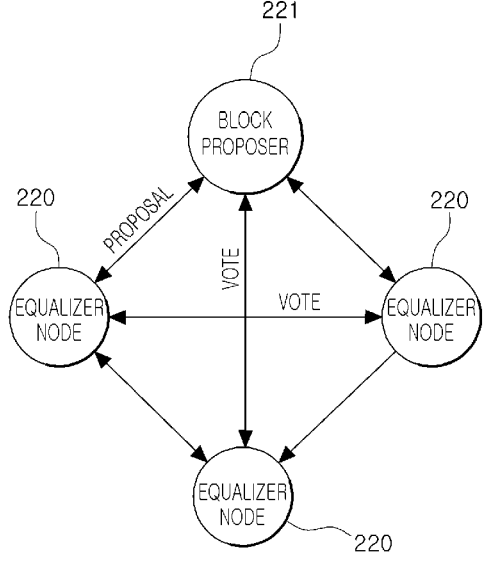
FIG. 9 is a diagram illustrating a vote stage of the blockchain provision method using a non-competitive consensus algorithm and a micro-chain to ensure transaction processing speed and scalability useful for commercial services according to an exemplary embodiment in the present disclosure.

In the "vote stage (S303)" according to an exemplary embodiment in the present disclosure, as illustrated in FIG. 9, the equalizer node 220 may also propagate the votes to other equalizer nodes 220.

In this case, the votes may mean that a vote including a round and a height of a proposal and a proposal hash is signed with a private key.

In addition, as illustrated in FIG. 9, when there is a vote exceeding ⅔ of the total number of equalizer nodes 220 for a specific proposal by exchanging votes between the equalizer nodes 220 participating in consensus, the propose may be considered valid and the commit stage (S304) may proceed. That is, similar to the prevote stage (S302), the predetermined ratio may mean ⅔ of the total number of equalizer nodes 220 or the randomly selected number of equalizer nodes 220 from among the predetermined number of randomly selected equalizer nodes 220.

Meanwhile, in the "vote stage (S303)" according to an exemplary embodiment in the present disclosure, when the votes of the equalizer node 220 exceeding a predetermined ratio (⅔ of the number of equalizer nodes) are not collected or the valid propose is not accepted within a predetermined time, the votes are considered invalid when the predetermined time or ratio condition is not satisfied. However, the equalizer node 220 of the present disclosure continuously increases the round by one stage until the predetermined ratio is exceeded (⅔ of the number of equalizer nodes), and the vote may be attempted by re-performing from the propose stage.

The existing pBFT method has a disadvantage in that, when a result greater than or equal to the quorum is obtained in the vote stage, the next block may not be stacked and the liveness of the proposed block may not be ensured while waiting until the quorum is reached. In this case, the proposed block (transaction) may not be processed or the block to be processed is opaque, so the proposed block is difficult to commercially use.

However, the present disclosure solves the above disadvantages and adopts a round method in which the vote is performed again so that the liveness of the proposed block (transaction) may be performed out within a short period of time.

In the commit stage (S304) according to an exemplary embodiment in the present disclosure, as illustrated in FIG. 7, each equalizer node 220 may generate a block and store commit data in a database. The block is generated through the transaction list included in the proposal, and the account state of each node is transited.

Figure 10:
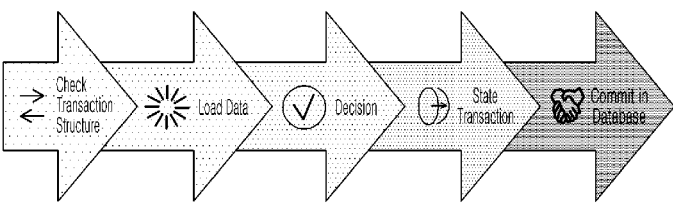
FIG. 10 is a diagram illustrating a commit stage of the blockchain provision method using a non-competitive consensus algorithm and a micro-chain to ensure transaction processing speed and scalability useful for commercial services according to an exemplary embodiment in the present disclosure.

Specifically, as illustrated in FIG. 10, the transaction list included in the proposal is checked, data is loaded, transition contents are determined according to the data, and state transition and commit data are stored in the database (commit in database).

In this case, the commit data may include account information and nonce including the block, transaction, and state for each smart contract transmitted through the transaction.

In addition, according to an exemplary embodiment in the present disclosure, the blockchain provision method may further include a networking stage of exchanging stage information including the height of a newly generated block before the propose stage (S301), a current round, and a previous block hash for each node between equalizer nodes 220, and merging the stage information of the equalizer nodes 220 to determine stage information for the entire network.

In the networking stage, the equalizer nodes 220 having the same stage information may participate in consensus and select the block proposer 221 from among the equalizer nodes 220 using the round-robin method.

In other words, in the networking stage, the transaction may be propagated between the equalizer nodes 220 and a proposer may be selected.

According to this operating process, in the present disclosure, when nodes stake network coins greater than or equal to the minimum staking amount, the nodes become the equalizer nodes 220 all having the same voting power. When the node becomes the equalizer node 220, it is randomly selected as a congress by a proof of stake consensus algorithm of various methods. The congress is a set of equalizer nodes 220 that will verify and agree on only the block itself without stacking blocks at the corresponding height. When the congress is decided, the block proposer 221 is determined through a round robin, the proposer propagates the block to the congress, and the propagated block is verified by the equalizer nodes 220 in the congress, and the verification result is voted and propagated to the congress. Each equalizer node 220 attaches the verification contents to a vote and, when a quorum of more than ⅔ is satisfied, proceeds to the execution stage and executes the transactions in the block to form a new block.

Figure 11:
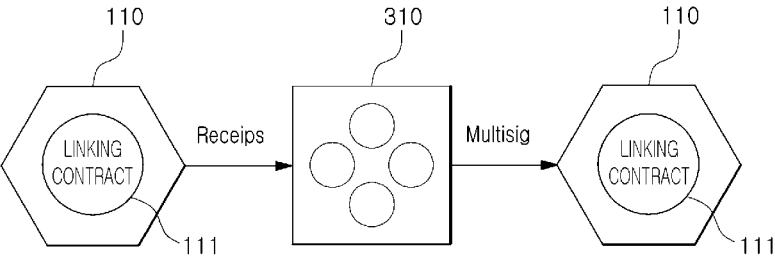
FIG. 11 is a diagram illustrating interworking solution architecture between micro-chains according to an exemplary embodiment in the present disclosure.

Meanwhile, as illustrated in FIG. 11, two micro-chains 110 may have a smart contract called a linking contract 111 for connection, and transfer assets to other micro-chains 110 through the smart contact. In the middle of the two micro-chains 110, some signers 310 may detect, sign, and deliver events in the form of transactions and observe the micro-chain 110. In addition, the signers 310 also detect and sign transactions transmitted to the agreed connected smart contract. The events signed by all signers 310 are transferred to the opposite micro-chain 110 in the form of the transaction including several signatures of the signers 310. Similarly, there is a connected smart contract on the opposite micro-chain 110 that verifies the signatures of the signers 310. The verified transaction is reflected in the micro-chain 110 and the asset movement between the micro-chains 110 is possible.

In this process, the signer 310 may stake assets on the linked smart contract and receive some transaction fees. On the other hand, when the malicious signer 310 is detected, the malicious signer 310 may confiscate staked assets through the linked smart contract.

EVM, commonly known when using contracts, is the Ethereum virtual machine, which is currently used as a standard in the blockchain market as the environment in which the smart contract may be developed, so the equilibrium, which is the blockchain system of the present disclosure, has also added the EVM to scale the developer ecosystem. The part that handles the gas exhausted in the EVM is related to the network fee paid by the user of the contract. In the case of the Ethereum's EVM, gas is designed to be exhausted every time the code is operated, so more complex codes or smart contracts that require a lot of processing require more gas, and block mining nodes prioritize transactions with higher gas prices, so users pay more fees for gas. Meanwhile, even in the case of the Equilibrium blockchain of the present disclosure, it costs more gas depending on the complexity of the code or the amount of operation in the EVM, but the input gas and used gas of the actual user are fixed, but the limit of gas usage is set, so it is designed to prevent a transaction having an infinite loop, eliminate the user's priority for gas prices, and enable commercial use through low prices.

Hereinafter, the transaction processing speed achieved in the single micro-chain 110 of the present disclosure will be described in detail based on the experimental results. However, it should be noted that the following Examples are only for illustrating the present disclosure in more detail and are not intended to limit the scope of the present disclosure. This is because the scope of the present disclosure is determined by the matters described in the claims and the matters reasonably inferred therefrom.

Figure 12:
FIG. 12 is a diagram illustrating a transaction processing time of an Equilibrium blockchain network according to an exemplary embodiment in the present disclosure.

Looking at the transaction processing time of the Equilibrium blockchain network with reference to FIG. 12, since the equilibrium blockchain network of the present disclosure builds new blocks every two seconds while processing an average of more than 6,000 transactions (token and coin transactions, smart contract interactions, etc.), which is a much higher transaction volume than other blockchains, it can be seen that the transaction processing time of the equilibrium blockchain network of the present disclosure is around 2 seconds, which may ensure the transaction processing speed, scalability, and security useful for commercial services.

Figure 13:
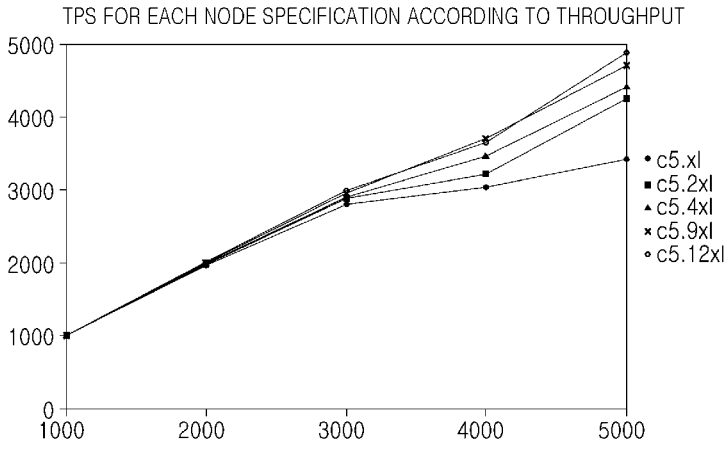
FIG. 13 is a graph illustrating the number of TPSs for each node specification according to the number of times of a load and throughput given to the Equilibrium blockchain network according to an exemplary embodiment in the present disclosure.

In addition, referring to FIG. 13, looking at the number of times of loads and the number of TPSs applied to the network, the equilibrium network of the present disclosure is not greatly affected by computer specifications, and when the number of times of loads applied to the network is 5000, the name may be confirmed in the average number of transactions (transaction per second (TPS)) that may be processed per second is 4,000 to 4,500.

In particular, in the equilibrium network of the present disclosure, the number of TPSs that may be processed per second is so high that it exceeds 4,200 when the number of times of loads on the network is 5,000 even when using a PC using C5 2XL based on AWS instances that are lower than PC specifications recommended by other blockchains.

Meanwhile, the verification tests for the block generation time and TPS, which are the transaction processing time for the present disclosure, are currently being conducted by Telecommunication Technology Association (TTA).

In addition, the equilibrium network of the present disclosure may ensure the liveness and finality regardless of malicious behavior in the environment assuming that less than 33% of malicious nodes exist in the network due to the pBFT-based consensus algorithm, make attack difficult because an external network attacker should attack more nodes at the same time in order to control the network by registering the equalizer through the minimum staking amount, and even if a specific micro-chain 110 is attacked or fails due to too much load on the network, since the remaining micro-chains 110 except for the corresponding business domain are isolated from fault, and the impact of external attacks or overloads is significantly smaller than the conventional blockchain network structure, have excellent security.

The above-described blockchain provision system and method using a non-competitive consensus algorithm to ensure transaction processing speed, scalability, and security useful for commercial services of the present disclosure may include the micro-chain architecture composed of the mainnet 120 and the micro-chain 110 that do not interfere with each other, divide nodes into the equalizer nodes 220 and the non-equalizer nodes 210 according to the minimum staking amount with the non-competitive consensus algorithm, eliminate the fundamental processing speed delay problem of the mining process through the non-competitive consensus algorithm based on the pBFT (practical Byzantine fault tolerance) model that constructs a synchronized network that generates a new block by stacking other blocks on the proposed block to minimize network traffic so that the number of faulty nodes is less than ⅓ of the total nodes when a vote is performed on the proposed block in the vote stage and the complete consensus is reached, and secure unlimited scalability (scale-out) through the micro-chain architecture.

As set forth above, according to a blockchain provision system using a non-competitive consensus algorithm useful for commercial services of the present disclosure and micro-chain architecture for fault isolation and interference minimization, when a defect does not exceed a predetermined percentage of the total, the system may operate normally to greatly increase a transaction processing speed (e.g., 4,500 tps) on a single micro-chain, greatly reduce a confirmation time (e.g., 1 to 3 seconds), achieve almost unlimited scalability, greatly reduce transaction fees, and provide a blockchain solution for decentralized commercial services that solve a storage problem.

In addition, the present disclosure has an effect that even nodes with low-end computers can participate in a consensus procedure due to a simple consensus procedure and rapid processing.

What is claimed is:

1. A blockchain system using a micro-chain architecture to ensure transaction processing speed, scalability and security useful for commercial services, the blockchain system comprising:

a network configured to provide blockchain services,
wherein the network includes:
mainnets configured to communicate with other micro-chains in accordance with an inter-chain communication protocol and to issue or burn a coin, and
a micro-chain architecture including two or more micro-chains in which a smart contract conclusion performed using the coin operates according to each transaction area, wherein the two or more micro-chains are included among the other micro-chains with which the mainnets are configured to communicate, and
wherein each of the two or more micro-chains is configured to independently perform business transaction logic without interfering with each other, and
wherein each of the two or more micro-chains is configured to execute a different smart contract corresponding to each of the two or more micro-chains, and
wherein the micro-chain architecture further includes:
non-equalizer nodes configured to not participate in consensus and to only share a ledger; and
an equalizer node which is:
connected to and directly adjacent to the non-equalizer nodes, and
connected to and directly adjacent to equalizer nodes, wherein the equalizer node is configured to collect information of other nodes, to participate in consensus, and to perform verification of the smart contract,
wherein the other nodes comprise:
the non-equalizer nodes connected to the equalizer node; and
the equalizer nodes connected to the equalizer node.

2. The blockchain system of claim 1, wherein the two or more micro-chains are connected in an equal relationship by mutually securing trust with the mainnets, and are scalable from at least one micro-chain to a new micro-chain not directly connected to the mainnets.

3. The blockchain system of claim 1, wherein, when the equalizer nodes having staked coins equal to or greater than a minimum amount of staking participate in consensus and perform verification of the smart contract, the equalizer nodes have a same voting power.

4. The blockchain system of claim 3, wherein the equalizer node is randomly extracted from among the equalizer nodes having the same voting power according to a minimum number of nodes calculated to endure Byzantine fault, and the extracted equalizer node participates in consensus and verifies the smart contract.

5. The blockchain system of claim 1, further comprising:
a mempool configured to be allocated to each equalizer node of a plurality of equalizer nodes and to store a transaction including a key value obtained by converting a hash of a non-consensus transaction of the each equalizer node and a signature of a private key,
wherein:

the plurality of equalizer nodes are participating in the consensus, the plurality of equalizer nodes are included in a micro-chain common to the plurality of equalizer nodes, from among the other micro-chains with which the mainnets are configured to communicate, and the plurality of equalizer nodes comprise the equalizer node and the equalizer nodes which are connected to and directly adjacent the equalizer node.

6. The blockchain system of claim 5, wherein the equalizer node is configured to receive the transaction through a transaction request regardless of a consensus process, to perform a validity check on the received transaction, and to store the transaction in the mempool.

7. The blockchain system of claim 1, wherein the network includes equalizer nodes having the same voting power when coins equal to or greater than a minimum amount of staking are staked, wherein first equalizer nodes are selected as a block proposer from among all equalizer nodes included in the micro-chain architecture and are configured to generate a block for consensus and to verify the block, and wherein second equalizer nodes from among all equalizer nodes included in the micro-chain architecture are configured to perform a prevote to agree on validity of a propose for the verified block in a non-arithmetic operation method and a vote on the propose, and when a predetermined quorum is exceeded, the second equalizer nodes are configured to generate a block, to connect the generated block to the blockchain, and to generate a new block.

8. The blockchain system of claim 7, wherein the first equalizer nodes are randomly extracted from equalizer nodes having staked coins equal to or greater than the minimum amount of staking according to a minimum number of nodes calculated to endure Byzantine fault, wherein the equalizer nodes having the staked coins equal to or greater than the minimum amount of staking are included are included in a micro-chain common to the equalizer nodes having the staked coins equal to or greater than the minimum amount of staking, from among the other micro-chains with which the mainnets are configured to communicate.

9. The blockchain system of claim 7, wherein, when a vote on the propose is performed, verification is performed in a proposed transaction state, and the new block is generated by stacking the generated block on a previously existing block fully agreed upon.

10. The blockchain system of claim 7, wherein the two or more micro-chains are connected in an equal relationship by mutually securing trust with the mainnets, and are scalable from at least one micro-chain to a new micro-chain not directly connected to the mainnets.

11. A blockchain method using a non-competitive consensus algorithm and a micro-chain architecture to ensure transaction processing speed, scalability, and security useful for commercial services using a blockchain system, the blockchain method comprising:

a propose step of generating, by an equalizer node selected as a block proposer from among all equalizer nodes, a block including a transaction for consensus and propagating the generated block to other equalizer nodes that are not selected as the block proposer;

a prevote step of verifying, by the other equalizer nodes receiving the generated block, validity of the generated block as received by the other equalizer nodes and propagating a prevote to one another among the other equalizer nodes when verification is completed;

a vote step of performing a vote on a propose of the equalizer node to bring the generated block into a consensus and propagating voting results signed with a private key to one another among the other equalizer nodes, when the number of equalizer nodes that have propagated the prevote exceeds a predetermined ratio of the equalizer nodes; and a commit step of executing, by each equalizer node, a proposed transaction and generating a new block when the voting results of the equalizer nodes a are collected, wherein the prevote step is performed in a true and false method which is a non-arithmetic operation method, and the vote step is configured to execute a vote on the generated block such that the new block is generated by stacking the generated block on a previously existing block fully agreed upon.

12. The blockchain method of claim 11, further comprising:

receiving, by a requesting equalizer node included among the all equalizer nodes, a transaction when there is a transaction request from the requesting equalizer node regardless of the progress of the consensus, and storing the transaction in a mempool of the requesting equalizer node when a validity check for the transaction is completed; and transferring the transaction stored in the mempool to other equalizer nodes.

13. The blockchain method of claim 11, wherein, to generate a transaction for consensus, the propose step includes:

generating a transaction list by integrating only transactions having a nonce of an account sequentially increasing from a nonce of a current account among transactions stored in a mempool of each of the all equalizer nodes; and hashing a proposal including a height, a round, and a block for the transaction list and signing the proposal with a private key.

14. The blockchain method of claim 11, further comprising:

a networking step of exchanging stage information including a height of a newly generated block before the propose step, a current round, and a previous block hash for each node between all equalizer nodes, and determining stage information for the micro-chain architecture by merging the stage information of the equalizer nodes.

15. The blockchain method of claim 11, wherein, in the commit step, when the voting results of the equalizer nodes ratio are not collected or a valid proposal is not received within a predetermined time, the equalizer node increases a round by one stage and re-performs from the propose step.

16. A non-transitory computer-readable storage medium storing a computer program for executing the method of claim 11 on a computer.

* * * * *